United States Patent [19]
Raviv et al.

[11] Patent Number: 5,795,227
[45] Date of Patent: Aug. 18, 1998

[54] ELECTRONIC GAME SYSTEM

[76] Inventors: Roni Raviv, 7 Maccabi Street, Ness Ziona 70400; Omri Rothschild, 16 Barak Street, Zahala, Tel Aviv 69933, both of Israel

[21] Appl. No.: 673,384

[22] Filed: Jun. 28, 1996

[51] Int. Cl.$^6$ .................................................. A63F 9/22
[52] U.S. Cl. ........................... 463/34; 463/37; 463/46; 463/31
[58] Field of Search ........................... 463/1, 30–34, 463/36, 46, 37; 273/358, 460; 364/410; 345/4–5, 10, 87, 30, 157; 348/383, 552, 789, 838; 349/113

[56] References Cited

U.S. PATENT DOCUMENTS

| | | |
|---|---|---|
| H779 | 5/1990 | Verona . |
| 3,170,979 | 2/1965 | Baldwin et al. . |
| 4,398,799 | 8/1983 | Swift . |
| 4,542,903 | 9/1985 | Yokoi et al. . |
| 4,589,659 | 5/1986 | Yokoi et al. . |
| 4,636,866 | 1/1987 | Hattori . |
| 4,756,529 | 7/1988 | Stillinger . |
| 4,799,677 | 1/1989 | Frederiksen . |
| 4,853,764 | 8/1989 | Sutter . |
| 4,895,371 | 1/1990 | Bushner . |
| 4,895,376 | 1/1990 | Chiang Shiung-Fei . |
| 4,976,429 | 12/1990 | Nagel . |
| 4,988,111 | 1/1991 | Gerlizt et al. . |
| 5,003,300 | 3/1991 | Wells . |
| 5,014,982 | 5/1991 | Okada et al. . |
| 5,090,708 | 2/1992 | Gerlitz et al. . |
| 5,091,719 | 2/1992 | Beamon, III . |
| 5,095,798 | 3/1992 | Okada et al. . |
| 5,158,212 | 10/1992 | Sirhan . |
| 5,161,803 | 11/1992 | Ohara . |
| 5,162,828 | 11/1992 | Furness et al. . |
| 5,166,778 | 11/1992 | Beamon, III . |
| 5,184,830 | 2/1993 | Okada et al. . |
| 5,190,286 | 3/1993 | Watanabe et al. ................. 463/34 |
| 5,213,327 | 5/1993 | Kitaue . |
| 5,217,295 | 6/1993 | Tortola et al. . |
| 5,265,888 | 11/1993 | Yamamoto et al. . |
| 5,276,471 | 1/1994 | Yamauchi et al. . |
| 5,286,202 | 2/1994 | de Gyarfas et al. . |
| 5,308,086 | 5/1994 | Ueda et al. . |
| 5,321,416 | 6/1994 | Bassett et al. . |
| 5,322,441 | 6/1994 | Lewis et al. . |
| 5,334,991 | 8/1994 | Wells et al. . |
| 5,357,604 | 10/1994 | San et al. . |
| 5,362,068 | 11/1994 | Liu . |
| 5,368,309 | 11/1994 | Monroe et al. . |
| 5,392,158 | 2/1995 | Tosaki . |
| 5,406,415 | 4/1995 | Kelly . |
| 5,414,544 | 5/1995 | Aoyagi et al. . |
| 5,416,876 | 5/1995 | Ansley et al. . |
| 5,421,589 | 6/1995 | Monroe . |
| 5,467,205 | 11/1995 | Kuba et al. . |
| 5,469,185 | 11/1995 | Lebby et al. . |
| 5,473,365 | 12/1995 | Okamura . |
| 5,483,307 | 1/1996 | Anderson . |
| 5,485,172 | 1/1996 | Sawachika et al. . |

*Primary Examiner*—Jessica Harrison
*Assistant Examiner*—Mark A. Sager
*Attorney, Agent, or Firm*—Samuels, Gauthier, Stevens & Reppert

[57] ABSTRACT

A hand held computer game including a housing, game controls located on an outer surface of the housing, a light source disposed within the housing and being operative to direct light along a light path, an at least partially transparent image surface disposed along the light path and a non-transparent reflective viewing surface having optical power, mounted on the housing and arranged to display an enlarged image of the transparent image surface to a user.

9 Claims, 6 Drawing Sheets

ELECTRONIC GAME SYSTEM

FIELD OF THE INVENTION

The present invention relates to electronic games generally.

REFERENCE TO COPENDING APPLICATIONS

This application is copending with U.S. Pat. application Ser. No. 08/358,011 entitled ELECTRONIC GAME SYSTEM, filed Dec. 16, 1994, the disclosure of which is hereby incorporated by reference.

BACKGROUND OF THE INVENTION

A great variety of electronic games are known. The following U.S. patents are believed to represent the state of the art: 5,308,086; 5,286,202; 5,265,888; 5,217,295; 5,213,327; 5,184,830; 5,161,803; 5,158,212; 5,095,798; 5,014,982; 4,799,677. LCD cartridge games are also known and commercially available from Micro Games of America, North Hills, Calif. under the trademark Game Wizard.

A head mounted modular game known as R-Zone, manufactured by Tiger Electronics Inc. of Woodland Hills, Ill., which was invented by applicants and is based on copending U.S. Pat. application Ser. No. 08/358,011 entitled ELECTRONIC GAME SYSTEM, filed Dec. 16, 1994, has been on sale in the United States of America more than one year prior to the filing date of this application.

SUMMARY OF THE INVENTION

The present invention seeks to provide an improved electronic game.

There is thus provided in accordance with a preferred embodiment of the present invention a hand held computer game including:

a housing:

game controls located on an outer surface of the housing;

a light source disposed within the housing and being operative to direct light along a light path;

an at least partially transparent image surface disposed along the light path; and a non-transparent reflective viewing surface having optical power, mounted on the housing and arranged to display an enlarged image of the transparent image surface to a user.

Preferably, the non-transparent reflective viewing surface is formed of a generally monochromatic light transmissive substrate having a reflective backing.

Alternatively, the non-transparent reflective viewing surface is formed of a generally polychromatic light transmissive substrate having a dichroic coating and a reflective backing.

In accordance with a preferred embodiment of the present invention, the light source is operative to provide a generally monochromatic light output along the light path.

Preferably, the at least partially transparent image surface forms part of an interchangeable game cartridge.

In accordance with a preferred embodiment of the present invention, the at least partially transparent image surface comprises a liquid crystal display.

Preferably, the at least partially transparent image surface lies in an image plane which is not perpendicular to the light path.

BRIEF DESCRIPTION OF THE DRAWINGS

The present invention will be understood and appreciated more fully from the following detailed description, taken in conjunction with the drawing in which.

DETAILED DESCRIPTION OF PREFERRED EMBODIMENTS

Figure 1:
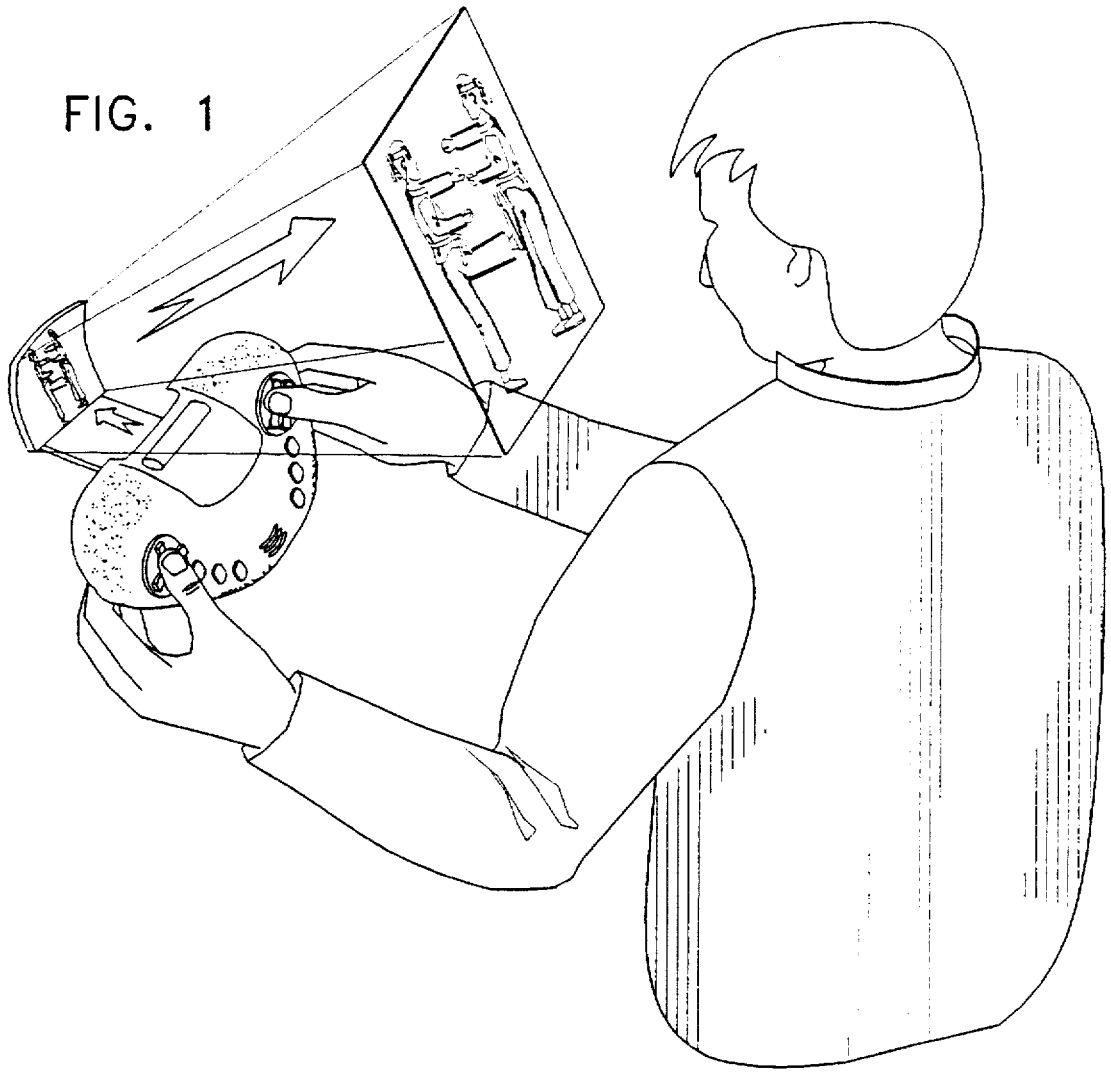
FIG. 1 is a pictorial illustration of a hand-held modular game system, constructed and operative in accordance with a preferred embodiment of the present invention, in operation.
Figure 2:
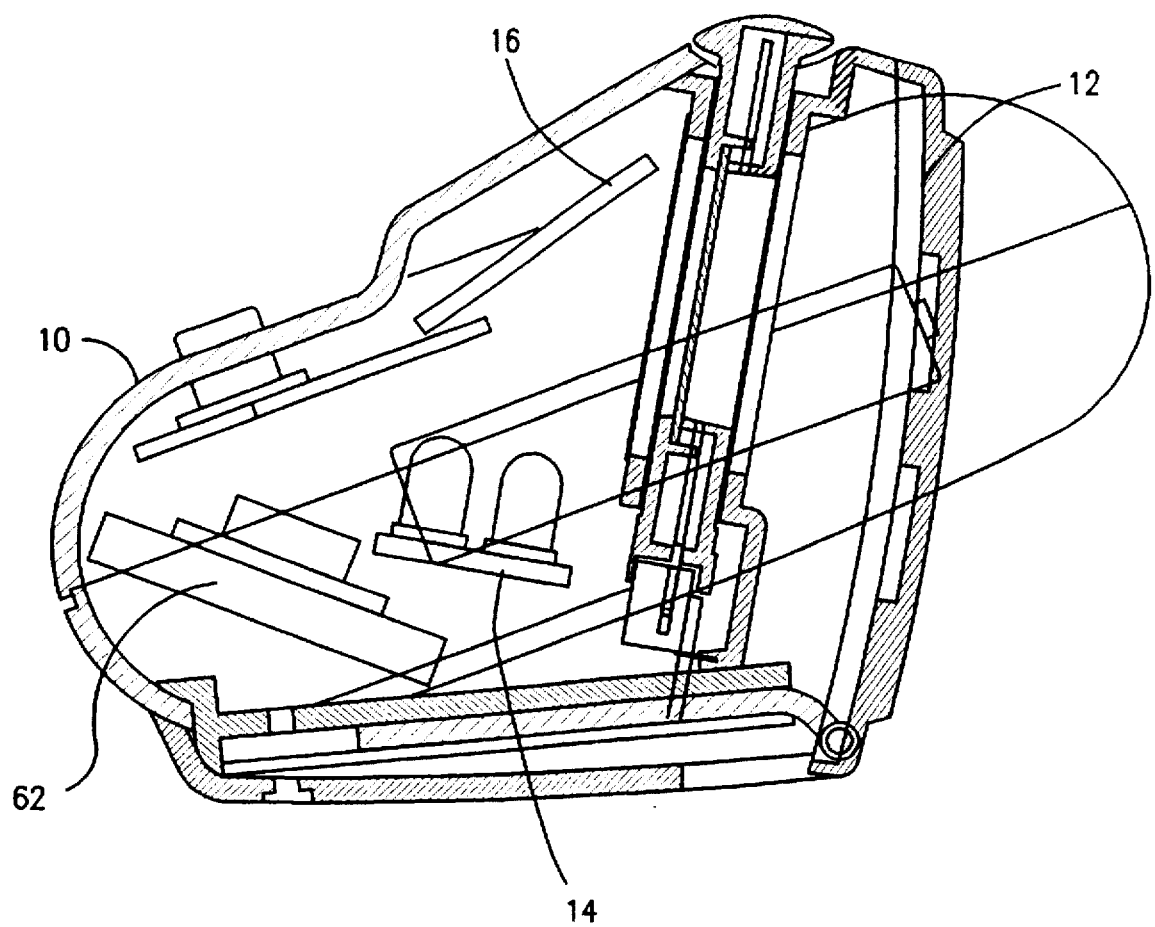
FIGS. 2 and 3 are side view, sectional illustrations of the system of FIG. 1 in non-operating and operating orientations, respectively.
Figure 3:
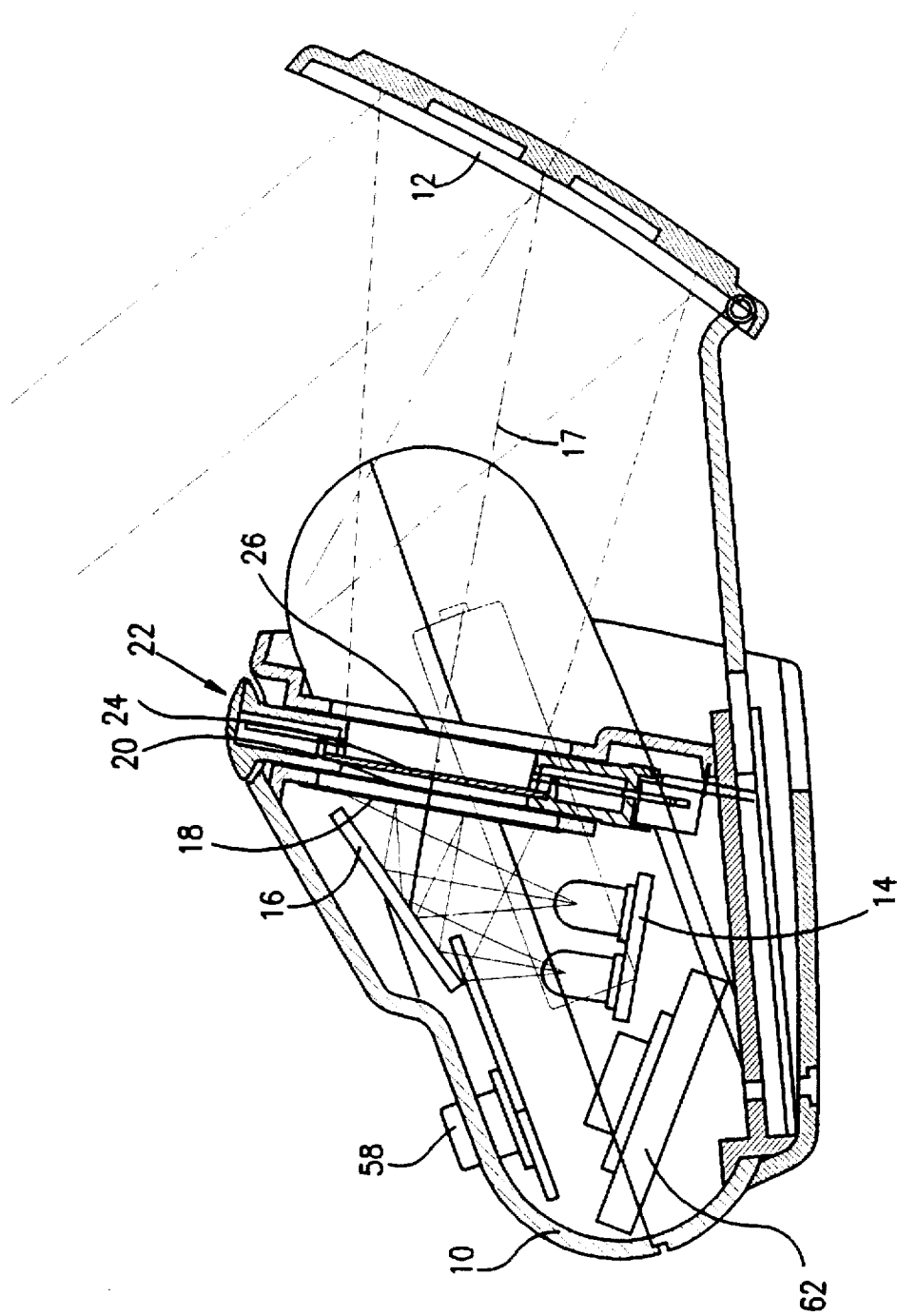

Reference is now made to FIGS. 1–3, which illustrate a hand-held modular game system constructed and operative in accordance with a preferred embodiment of the present invention. The system includes a hand-held housing 10 onto which is pivotably mounted a reflective viewing surface 12. It is a particular feature of the present invention that reflective viewing surface 12 has optical power and is operative to enlarge the image reflected thereby to the eyes of a user.

Preferably, the reflective viewing surface is transparent and is formed of a generally monochromatic light transmissive substrate having a reflective backing.

Alternatively, the non-transparent reflective viewing surface may have be formed of a generally polychromatic light transmissive substrate having a dichroic coating on a front surface thereof. As a further alternative, the non-transparent reflective viewing surface may be formed of a generally polychromatic light transmissive substrate having a reflective backing. As a further alternative, a reflective layer may be provided on a front surface of a substrate.

Disposed within housing 10 is a light source assembly 14 which directs light onto a mirror 16. Mirror 16 directs the light source along a light path extending generally along an axis 17, via a diffuser 18 and a first polarizing plate 20, which is preferably polarized along a first polarization axis. The light exiting first polarizing plate 20 traverses a game or entertainment cassette 22 which may be identical to that described in applicant's copending U.S. Pat. application Ser. No. 08/358,011 entitled ELECTRONIC GAME SYSTEM, filed Dec. 16, 1994, the disclosure of which is hereby incorporated by reference.

Cassette 22 preferably comprises an at least partially transparent image surface 24. In accordance with a preferred embodiment of the present invention, the at least partially transparent image surface comprises a liquid crystal display.

Preferably, the at least partially transparent image surface lies in an image plane which is not perpendicular to the light path.

Cassette 22 also preferably includes second polarizing plate 26 which is preferably polarized along a second longitudinal axis perpendicular to the first polarization axis.

Imagewise modulated light exiting from cassette 22 impinges on viewing surface 12 and is reflected thereby to the eyes of a user.

In accordance with a preferred embodiment of the present invention, the light source assembly 14 is operative to provide a generally monochromatic light output along the light path. This monochromatic light output is imagewise modulated as it passes through transparent image surface and is enlarged and reflected to the eyes of the user by curved viewing surface 12, as shown clearly in FIG. 1.

Figure 4:
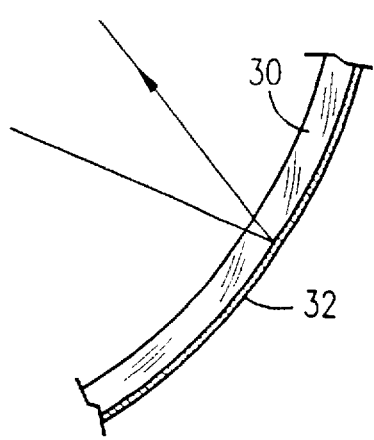
FIGS. 4, 5, 6 and 7 are simplified, side view sectional illustrations of a visor and sub-frame of the hand-held modular game system, constructed and operative in accordance with four different preferred embodiments of the present invention.
Figure 5:
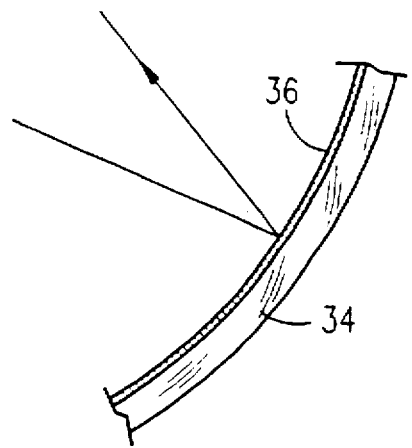

Reference is now made to FIGS. 4–7, which illustrate four alternative embodiments of viewing surface 12. FIG. 4 illustrates an opaque viewing surface comprising a transparent substrate 30 having a reflective metal backing 32. FIG. 5 illustrates an opaque viewing surface comprising a substrate 34 having a reflective metal front layer 36.

Figure 6:
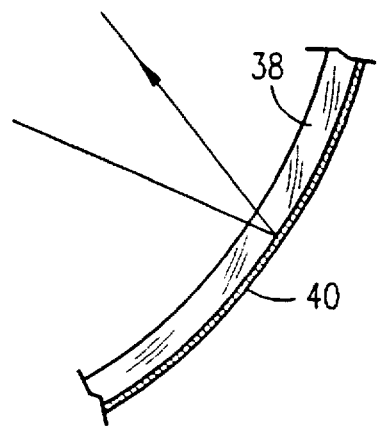

FIG. 6 illustrates the preferred embodiment of an opaque viewing surface, wherein a monochromatic transmissive substrate 38, such as red colored plastic, having a metal backing 40, provides a monochromatically colored image to the user's eyes. In this case a polychromatic light source may be employed.

Figure 7:
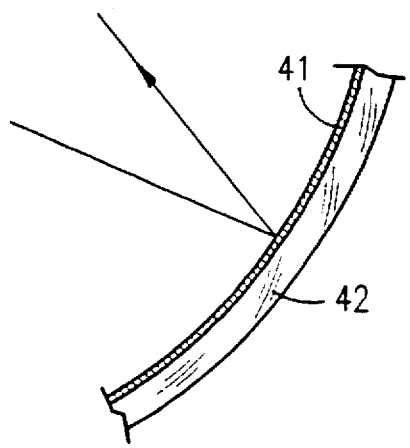

FIG. 7 illustrates a transparent viewing surface comprising a transparent substrate 42 having a dichroic coating 44 on a front surface thereof. This type of viewing surface is used with a monochromatic light source which is matched with the reflection band of the dichroic coating, such that the image seen by the user is a combination of the modulated image in a selected wavelength produced by the light source combined with a view of the outside in all wavelengths other than the selected wavelength.

Figure 8:
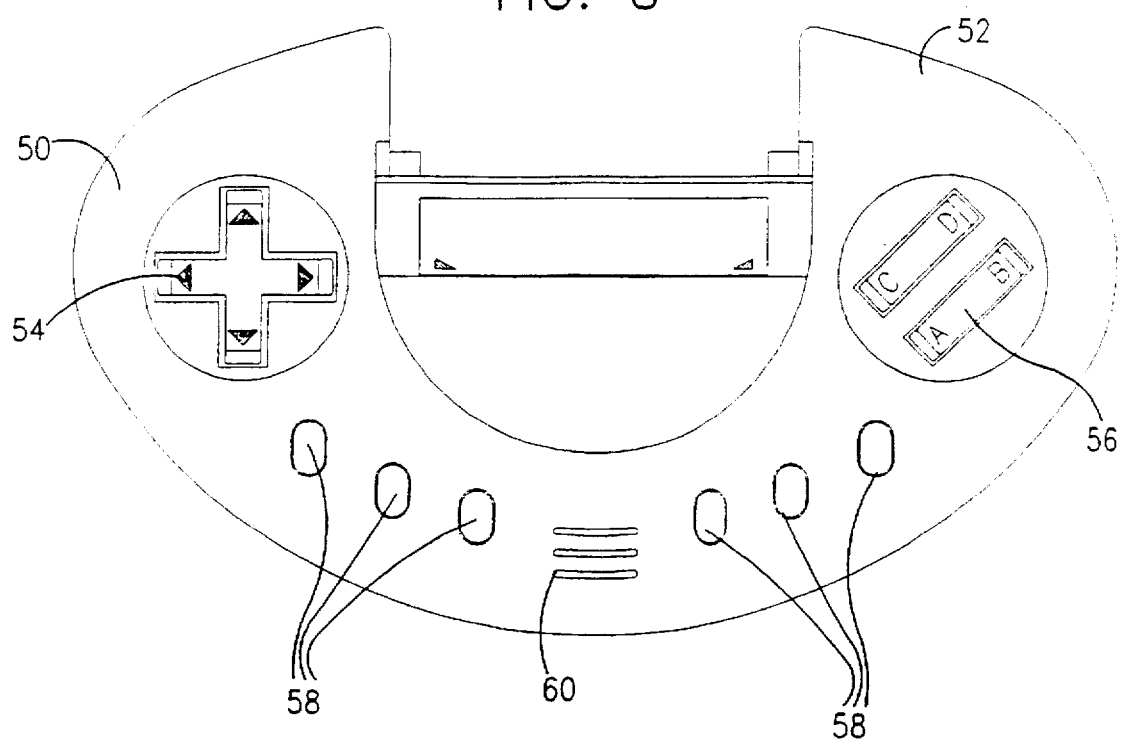
FIGS. 8 and 9 are respective top view and side view illustrations of the hand-held modular game system of FIG. 1.
Figure 9:
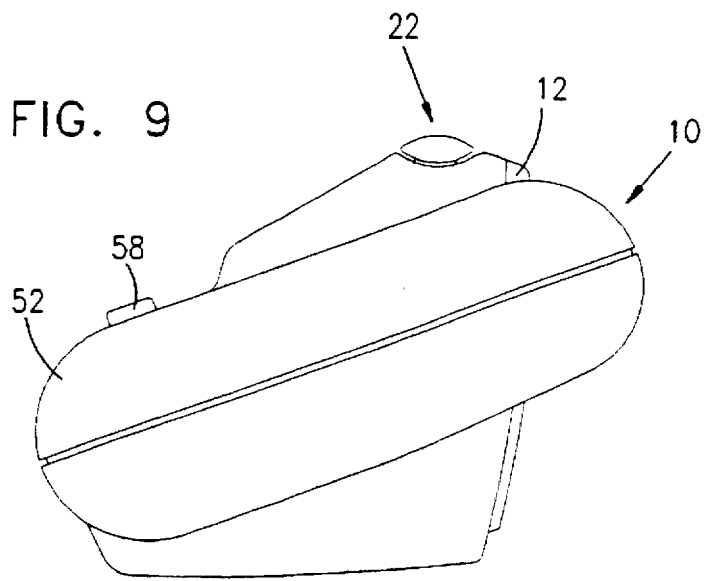
Figure 10:
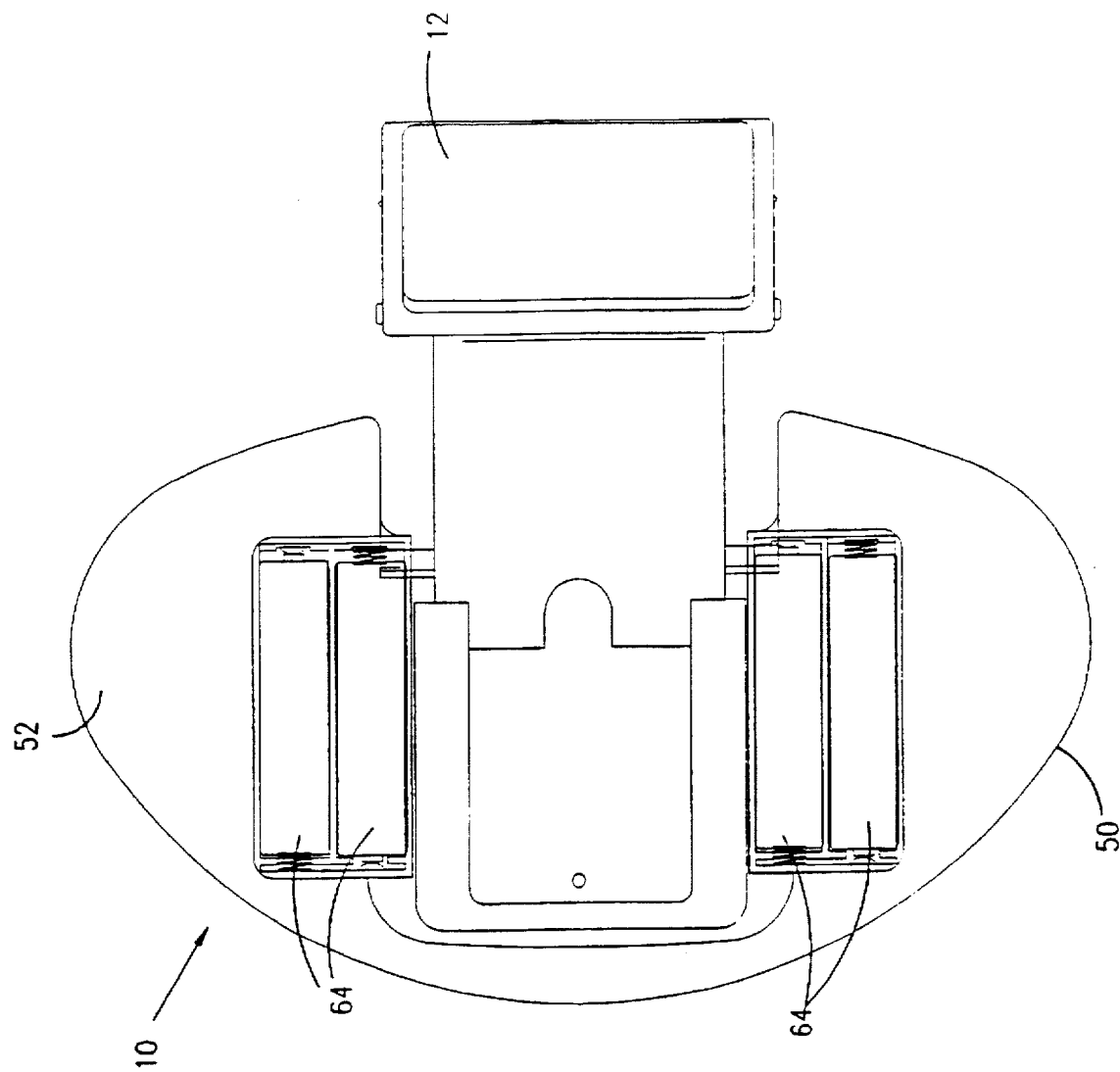
FIG. 10 is a bottom view, partially cutaway illustration of the system of FIG. 1 in an operating orientation.

Referring now to FIGS. 8–10, it is seen that the overall configuration of the housing 10 includes a pair of side extension portions 50 and 52 on which game controls 54 and 56 are provided. A plurality of operating push buttons 58 are provided on both sides of a speaker 60. As seen particularly in FIGS. 2 and 3, electrical circuitry 62 is disposed within housing 10. This circuitry may be powered by batteries 64 which may be housed at the underside of the housing, as illustrated in FIG. 10. The circuitry is controlled by push buttons 58 and game controls 54 and 56. Push buttons 58 typically may provide the following functionalities: ON, OFF, START,SELECT, SOUND and PAUSE.

It will be appreciated by persons skilled in the art that the present invention is not limited by what has been particularly shown and described hereinabove. Rather the scope of the present invention is defined only by the claims which follow:

We claim:

1. A computer game comprising:

a housing;

game controls located on an outer surface of said housing;

a light source disposed within said housing and being operative to direct light along a light path;

an at least partially transparent image surface disposed along said light path; and a non-transparent reflective viewing surface having optical power, mounted on said housing and arranged to display an enlarged image of said transparent image surface to a user, said non-transparent reflective viewing surface being formed of a generally monochromatic light transmissive substrate having a reflective backing.

2. A computer game according to claim 1 and wherein said light source is operative to provide a generally monochromatic light output along said light path.

3. A computer game according to claim 1 and wherein said at least partially transparent image surface forms part of an interchangeable game cartridge.

4. A computer game according to claim 1 and wherein said at least partially transparent image surface comprises a liquid crystal display.

5. A computer game according to claim 1 and wherein said at least partially transparent image surface lies in an image plane which is not perpendicular to said light path.

6. A computer game comprising:

a housing;

game controls located on an outer surface of said housing;

a light source disposed within said housing and being operative to direct light along a light path;

an at least partially transparent image surface disposed along said light path; and a non-transparent reflective viewing surface having optical power, mounted on said housing and arranged to display an enlarged image of said transparent image surface to a user, said non-transparent reflective viewing surface being formed of a polychromatic light transmissive substrate having a dichroic coating and a reflective backing.

7. A computer game according to claim 6, wherein said at least partially transparent image surface forms part of an interchangeable game cartridge.

8. A computer game according to claim 6, wherein said at least partially transparent image surface comprises a liquid crystal display.

9. A computer game according to claim 6, wherein said at least partially transparent image surface lies in an image plane which is not perpendicular to said light path.

\* \* \* \* \*